United States Patent [19]
Rehl et al.

[11] Patent Number: 5,740,378
[45] Date of Patent: Apr. 14, 1998

[54] HOT SWAP BUS ARCHITECTURE

[75] Inventors: F. Christian Rehl, Medway, Mass.; Mark D. Polomski, Hollis, N.H.

[73] Assignee: VideoServer, Inc., Burlington, Mass.

[21] Appl. No.: 516,343

[22] Filed: Aug. 17, 1995

[51] Int. Cl.$^6$ ..................................... H01J 13/00
[52] U.S. Cl. .................. 395/283; 395/281; 395/308; 395/309; 395/311; 395/182.05; 395/182.06; 395/183.01
[58] Field of Search ..................... 395/281, 282, 395/283, 306, 308, 309, 200.12, 200.13, 200.19, 200.2, 822, 881, 750, 800, 700, 500, 527, 311, 182.05, 182.06, 183.01

[56] References Cited

U.S. PATENT DOCUMENTS

| | | | |
|---|---|---|---|
| 4,697,858 | 10/1987 | Balakrishnan | 439/61 |
| 4,979,914 | 12/1990 | Robbins et al. | 439/681 |
| 4,999,787 | 3/1991 | McNally et al. | 395/283 |
| 5,010,446 | 4/1991 | Scannell | 361/398 |
| 5,122,691 | 6/1992 | Balakrishnan | 307/475 |
| 5,202,965 | 4/1993 | Ahn et al. | 395/325 |
| 5,210,855 | 5/1993 | Bartol | 395/500 |
| 5,247,619 | 9/1993 | Mutoh et al. | 395/283 |
| 5,317,697 | 5/1994 | Husak et al. | 395/325 |
| 5,384,492 | 1/1995 | Carlson et al. | 307/147 |
| 5,530,302 | 6/1996 | Hamre et al. | 395/280 |
| 5,530,810 | 6/1996 | Bowman | 395/283 |
| 5,572,685 | 11/1996 | Fisher et al. | 395/287 |
| 5,572,688 | 11/1996 | Sytwu | 395/309 |
| 5,581,712 | 12/1996 | Herrman | 395/283 |
| 5,584,030 | 12/1996 | Husak et al. | 395/750 |

FOREIGN PATENT DOCUMENTS

| | | |
|---|---|---|
| 93/15464 | 8/1993 | WIPO |

OTHER PUBLICATIONS

Cope, M. E., "Single–Board System Foundation Benefits Product Integrators," *Computer Technology Review*, pp. 52–53 (May 1985).

*Computer Telephony*, 16 unnumbered pages (Jun. 1995).

"Multi–Vendor Integration Protocol—H–MVIP, Working Document," GO–MVIP, The Global Organization for Multi–Vendor Integration Protocol, pp. 1–13, (Apr., 1995).

"Multi–Vendor Integration Protocol Reference Manual, Release 1.0," Natural MicroSystems Corporation, 12 pages, 1991.

Andrews, W., "Extender Board Brings Live Insertion to VME Systems," *Computer Design*, p. 120 (1992, Aug.).

Andrews, W., "Hot Swap Broadens Multibus II Horizons," *Computer Design*, pp. 32, 34, and 36 (1992, May).

"Low–Cost sBus Extender Board Offered by Dawn VME Products," News Release, Mar. 19, 1993.

"Radstone Introduces First Live Insertion Module to Give Hot Swap Capability to Any Standard VMEbus Board," News Release, Apr. 1993.

"The First Intelligent Extender Board for IBM AT or Compatible Personal Computer," News Release, Oct. 1, 1989.

"NewBus Rolls PCI Board; Unveils Its 1st PCI–bus Extender Board," *Electronic News*, p. 26, (Oct. 24, 1994).

"New Live Insertion VME Backplane," News Release, Aug. 30, 1993.

"Live Insertion Scheme to Update Bus; VME to Go Live in 93; Live Insertion Specification for VMEbus Community to be Established," *Electronic Engineering Times*, (Nov. 1992).

Bauer, M., "You Need an Industrial–Grade PC," *Computer Telephony*, (Sep., 1995).

*Primary Examiner*—Jack B. Harvey
*Assistant Examiner*—Raymond N. Phan
*Attorney, Agent, or Firm*—Hamilton, Brook, Smith & Reynolds, P.C.

[57] ABSTRACT

An apparatus and method for replacing circuit boards in a live communication system having an over-the-top ribbon cable data bus configuration. The ribbon cables are segmented and redirected between individual circuit boards and a backplane data bus. Each ribbon cable connects either directly to the backplane or to an interposer board coupled between the circuit board and the backplane. Isolation circuitry either on the backplane or on the interposer board isolates clock and data signals between the backplane and a circuit board selected for replacement.

10 Claims, 6 Drawing Sheets

HOT SWAP BUS ARCHITECTURE

BACKGROUND OF THE INVENTION

In a telecommunications environment, such as in a telephone central office, customer expectations of superior service assurance dictate high levels of equipment availability and reliability. The expense of providing highly reliable central office computer-based equipment is justified because such expense is shared over a large number of customers.

One aspect of typical telecommunications equipment which improves overall system availability is "hot swap" or live insertion capability. "Hot swap" capability refers to the ability to replace failed circuit boards without powering down a whole system. Several hot swap schemes are known which employ electro-mechanical means to allow circuit board insertion and extraction. Such schemes typically use different length pins to control power connection and disconnection and circuitry to connect and disconnect output drivers from control and signal buses. One scheme employs a reset signal via a button to place a selected circuit board in a passive state during circuit board extraction. Another system uses a live insertion module coupled between a communication bus and a circuit board to provide complete isolation during power up/down sequences. A removal switch attached to the module activates power down of the module to allow circuit board removal.

With the explosion of new services in the telecommunications market, PC-based systems have migrated into the central office environment as adjunct systems for meeting some of these service needs. However, standard PC-based systems typically do not meet the availability requirements of the telecommunications environment. Modifications to improve the reliability of PC-based systems include adding redundant power supplies and disk drives. Nevertheless, typical systems have to be shut down in order to replace a failed circuit board. This down time is unacceptable in a telephone central office environment.

One common PC-based adjunct system modified for a telecommunications environment involves the addition of application-driven communication buses such as the Multi-Vendor Integration Protocol® (MVIP) communication bus. (*H-MVIP Working Document*, GO-MVIP, Inc., April 1995; *Multi-Vendor Integration Protocol Reference Manual Release* 1.0, Natural MicroSystems Corporation, 1991.) MVIP supports the integration of technology from diverse vendors and the integration of telephony functions and computing capacity by providing standard elements or protocols. These include a digital telephony bus, a telephone switching capability and the software conventions needed for an integrated system. The MVIP communication bus is typically implemented as a single ribbon cable which passes signals from circuit board to circuit board in a PC chassis.

Any hot swap of circuit boards configured with an MVIP ribbon bus are mechanically constrained by the ribbon cable. This can be seen in the configuration shown in FIG. 1. In this prior art circuit board configuration, circuit boards 10 connect to a backplane 12 by means of connectors 14. The backplane 12 may be in a standard PC chassis (not shown) and includes a communication bus, such as an Industry Standard Architecture (ISA) bus 16. A ribbon cable 18 is connected between circuit boards 10 via data bus connectors 20 and forms a communication bus such as an MVIP-compatible bus. Specifically, referring to FIG. 1, removal of any circuit board in this configuration is impeded by the presence of the ribbon cable 18. In addition, disconnecting the ribbon bus cable from the particular circuit board to be removed is likely to disrupt communications between other circuit boards connected via the bus.

SUMMARY OF THE INVENTION

The above-noted problem could be avoided in a proprietary bus system by, for example, redesigning the system circuit boards and backplane to obviate the need for an over-the-top ribbon bus cable. However, since many telecommunications systems today are built to be compatible with open standards, it would be disadvantageous to require non-standard circuit boards. Instead, the present invention requires no circuit board modification, a key advantage in a multi-vendor environment.

Thus, in accordance with the present invention, electronics boards are plugged to a backplane common bus at first edges of the boards. Each electronics board has a data bus connector at a second edge, with data bus cables connecting the data bus connectors in a bus. The system further includes a backplane data bus to which opposite ends of the bus cables are connected. With this arrangement, a board may be unplugged from the data bus by disconnecting the associated bus cable without disrupting communications between other boards connected to the data bus. In a preferred embodiment, the data bus comprises a synchronous serial bus such as a Multi-Vendor Integration Protocol compatible bus.

According to another aspect of the invention, apparatus for replacing a circuit board in a live communication system without powering down includes a backplane having first and second connectors coupled to first and second buses respectively. Each first connector couples a circuit board to the backplane. Data bus cables, each removably coupled between a circuit board and a second connector, carry clock signals and bi-directional data signals.

Isolation circuitry mounted on the backplane includes clock circuitry operable to pass first clock signals received from a circuit board to the second bus and to pass second clock signals received from the second bus to the respective circuit board. Switching circuitry in the isolation circuitry is operable to pass bi-directional data signals to and from the second bus and the respective circuit board. The isolation circuitry is responsive to a selection signal which disables the clock and switching circuitry when the respective circuit board is being replaced such that the second bus is isolated from the circuit board.

In a preferred embodiment, the isolation circuitry is mounted on a backplane interposer board that is coupled between a backplane connector and a circuit board. Data bus cables are each removably coupled between one of the circuit boards and one of the associated interposer boards for carrying clock and bi-directional data signals.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular apparatus embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
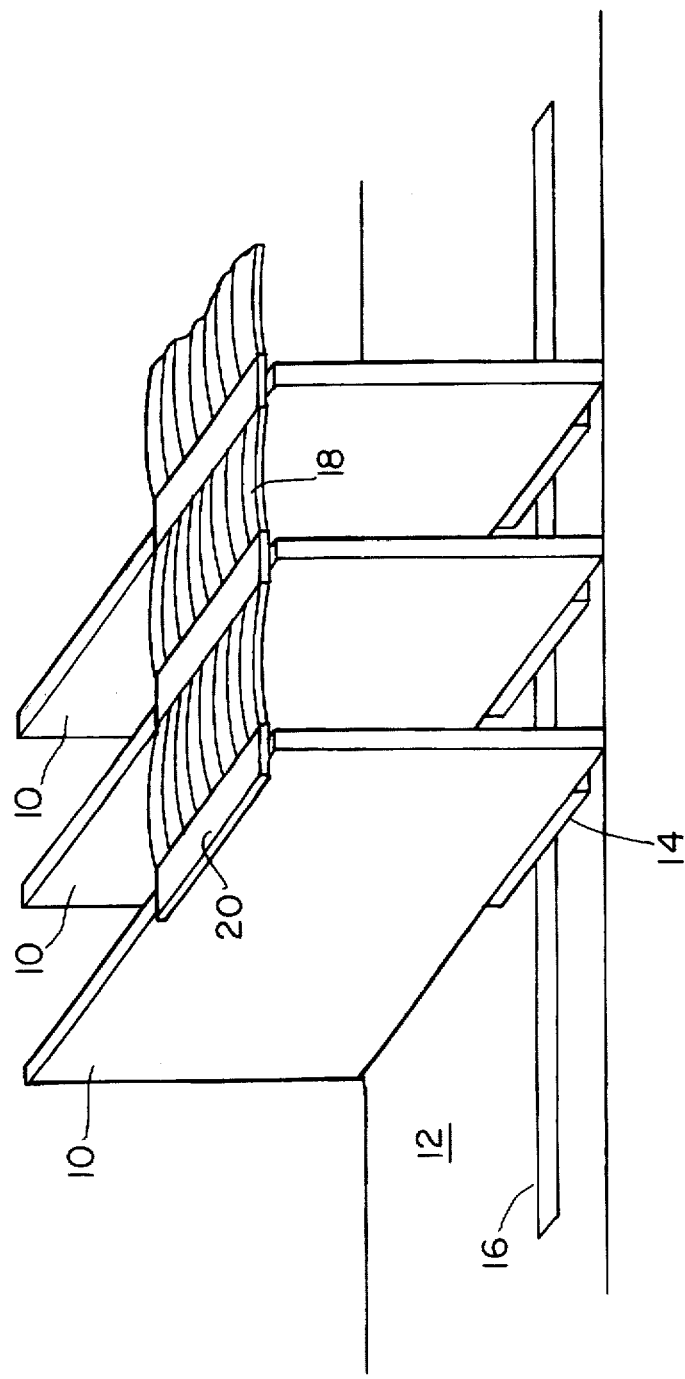
FIG. 1 is a perspective view of a prior art ribbon bus configuration in a PC-based system.
Figure 2:
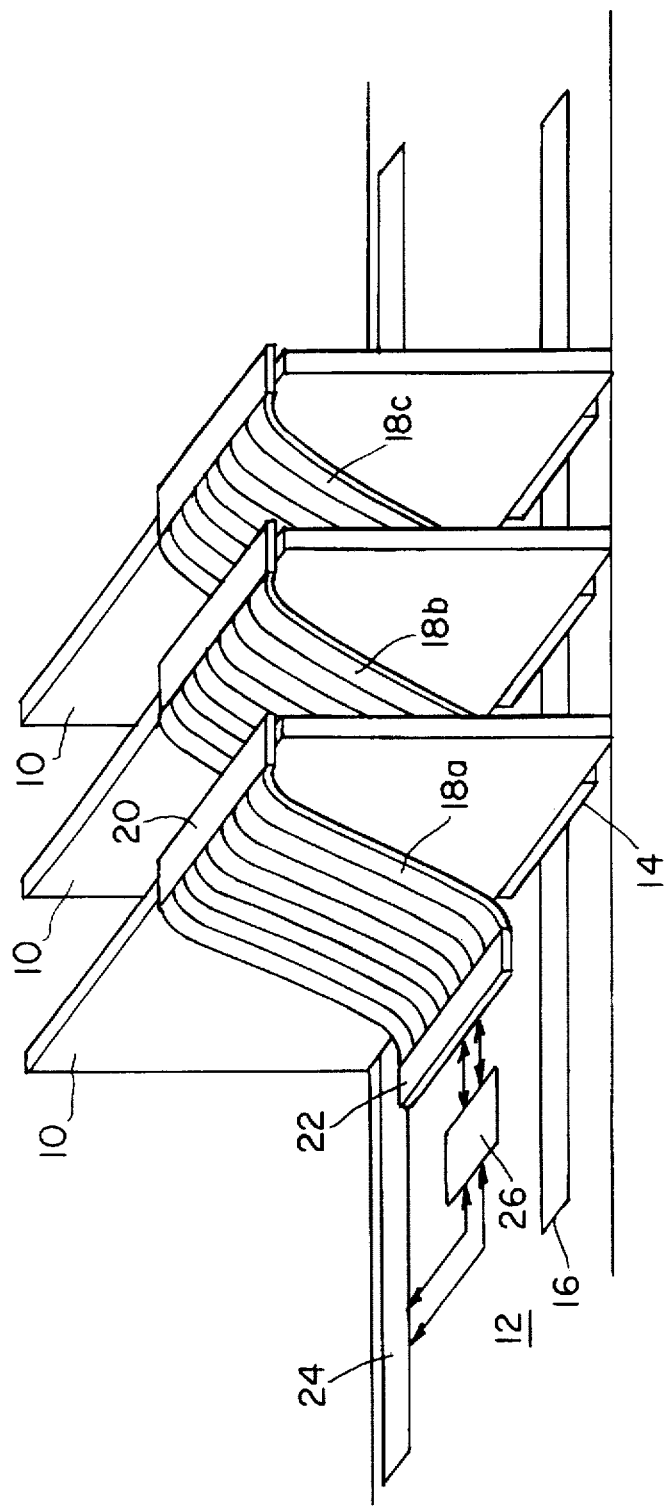
FIG. 2 is one embodiment of the present invention wherein ribbon bus cables are directly connected to a PC backplane.

Referring to FIG. 2, a first embodiment of the present invention is shown wherein ribbon bus cables are directly connected to a PC backplane. One aspect of the arrangement shown in FIG. 2 is that by redirecting ribbon cables from each circuit card directly to the backplane, the physical constraint of the over-the-top ribbon arrangement of FIG. 1 is avoided. Specifically, the ribbon cable 18 of FIG. 1 is redirected as individual ribbon cables 18a, 18b and 18c in FIG. 2. The ribbon cables 18a, 18b and 18c are redirected to connectors 22 on the backplane 12. A backplane data bus 24 is formed on the backplane 12 and may serve as an MVIP-compatible bus for circuit boards 10. The individual ribbon cables 18a, 18b and 18c pass signals to and from the circuit boards 10 through isolation circuitry 26 to the backplane data bus 24. Thus, whereas in the prior art arrangement of FIG. 1, the ribbon cable 18 formed an MVIP data bus across the top of circuit boards 10, the present invention forms a data bus 24 to which the circuit boards 10 are individually and independently connectable.

With this novel arrangement, a circuit board 10 may be disconnected from the data bus 24 by disconnecting its associated ribbon bus cable 18a–18c without disrupting communications between other boards on the data bus 24, yet no changes are made to the boards. The isolation circuitry 26 which passes clock and data signals between the data bus 24 and the circuit board 10 through ribbon cables 18a–18c provides the means for avoiding disruption of communications between other circuit boards when an individual board is connected or disconnected from the data bus. In normal operation, the isolation circuitry 26 passes the clock and data signals between the data bus 24 and the circuit board 10. For hot swap operation, the isolation circuitry 26 is responsive to a selection signal to isolate a circuit board 10 which is being replaced such that the data bus 24 is isolated from that circuit board. The isolation circuitry 26 is described further below in relation to a preferred embodiment.

Figure 3:
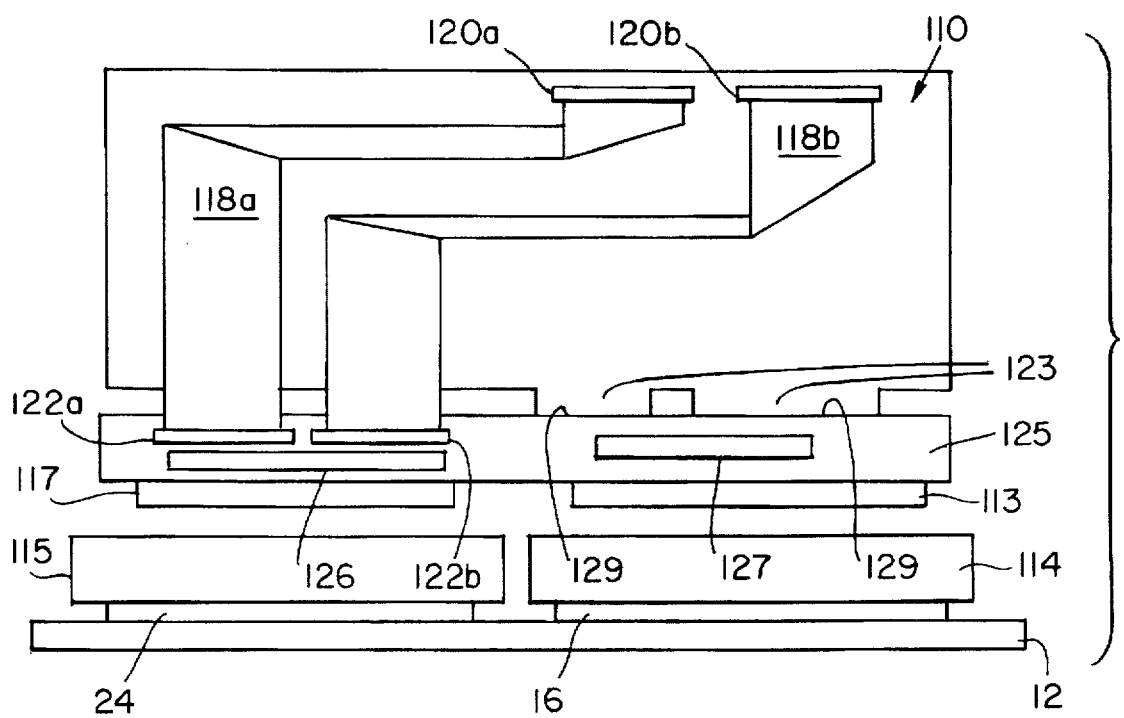
FIG. 3 is a side view of a preferred embodiment showing an interposer arrangement according to the present invention.

FIG. 3 shows a preferred embodiment of the present invention which is useful for a communication system of the type disclosed in U.S. patent application Ser. No. 08/379,274 which is incorporated herein in its entirety by reference. That application discloses a video teleconferencing system which is based on a PC platform. Because of the limitations of the ISA bus, the system includes MVIP-compatible buses to support interconnection of digital voice, video, and data traffic between circuit boards. Specifically, a Network Interface Unit (NIU) bus provides communications of unsynchronized data frames between network interfaces and system-specific circuit boards while a Bridge Processing Unit (BPU) bus provides communications of processed data frames among the system-specific circuit boards.

The preferred embodiment takes advantage of ISA bus "hot swap" circuitry in an interposer board arrangement. Specifically, an interposer board 125 having ISA hot swap circuit 127 is coupled between a circuit board 110 and the backplane 12. The present invention adds to the interposer board 125 MVIP bus isolation circuitry 126 which is described further herein. The interposer board 125 has edge connectors 113 and 117 which connect to the backplane 12 through connectors 115 and 114. Connector 114 connects to the ISA bus 16 and connector 115 connects to the data bus 24. The interposer board 125 has receptacles 129 at its top end for receiving edges 123 of the circuit board 110. The edges 123 typically provide the ISA control and data signals to be coupled through the interposer board 125 to the ISA bus 16. There are two ribbon cable headers 122a and 122b located on the interposer board 125, each terminating a ribbon cable 118a, 118b from the circuit board 110. The ribbon cables 118a, 118b terminate at their other end at headers 120a and 120b on the circuit board 110.

The circuit board 110 may be any typical communications board used within a PC chassis. Preferably, the circuit board 110 is used in an MVIP based system such as that described in the above-referenced patent application. In an MVIP based system, the ribbon cables 118a and 118b can be MVIP buses.

The MVIP bus is a multiplexed digital telephony highway which provides a standard interconnection for digital telephone traffic between individual circuit boards and a standard computer chassis. The MVIP bus provides synchronous time division multiplexed transport of N×64 Kbps constant bit rate data streams between circuit boards. Such data streams are commonly referred to as telephony data streams and are characterized by 8 KHz framing. The 64 Kbps data streams are also referred to as time slots.

An MVIP bus according to the MVIP-90 standard consists of 16 serial lines providing 8 separate bi-directional data streams. Each data stream operates at 2.048 Mbps and is capable of carrying 32 channels of 64 Kbps each. Thus, a single MVIP bus according to the MVIP-90 standard has the capacity for 256 full duplex telephone channels. The data streams are passed from circuit board to circuit board within one PC chassis using a 40 pin ribbon cable and mass termination connectors at each circuit board.

An MVIP bus according to the H-MVIP standard consists of 24 serial data streams which may be programmed to operate at either 2 Mbps or 8 Mbps. Depending upon the speed, a data stream supports either 32 time slots (at 2 Mbps) or 128 time slots (at 8 Mbps), for a total bus capacity programmable from 768 time slots to 3072 time slots.

Figure 4:
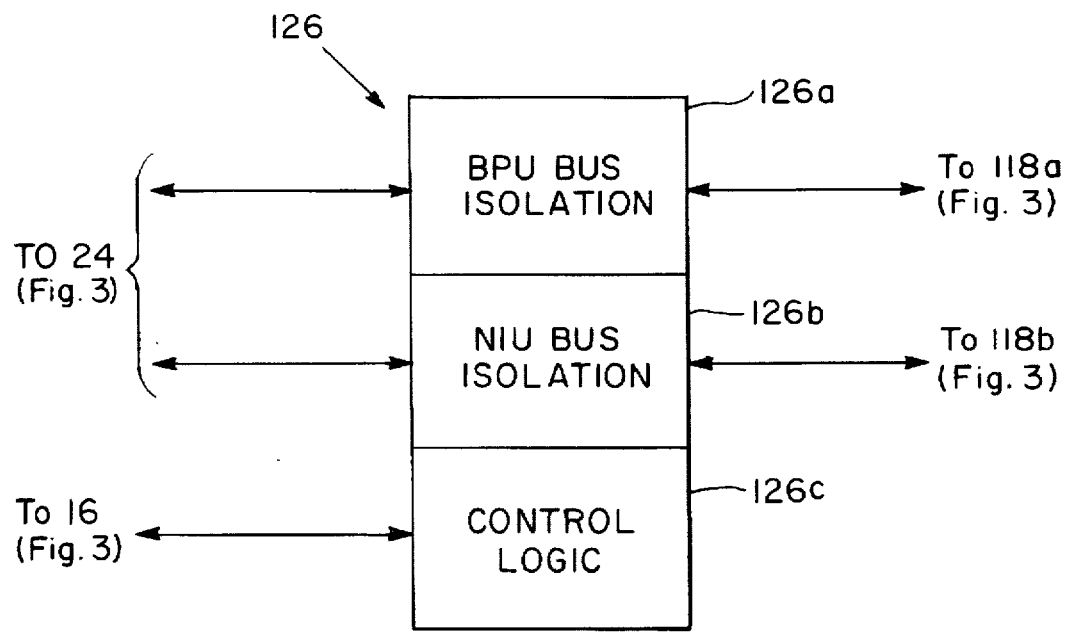
FIG. 4 is a block diagram of the isolation circuitry of the present invention.

The interposer board 125 in FIG. 3 includes isolation circuitry 126 which is shown in the block diagram of FIG. 4. In general, the isolation circuitry comprises switching circuitry for passing bi-directional data signals between the circuit board 110 and the backplane data bus 24 and clock circuitry for driving and receiving clock signals to and from the backplane data bus 24 and the circuit board 110. The isolation circuitry 126 thus includes a portion 126a for isolating ribbon bus cable 118a, a portion 126b for isolating ribbon bus cable 118b, and a control logic portion 126c. Isolation circuit portions 126a and 126b operate in a similar fashion with minor variations; thus, isolation circuitry portion 126a will be described in detail herein. It should be noted that the isolation circuitry 26 of the first embodiment (FIG. 2) may be substantially of the same structure and operation of either of circuit portions 126a and 126b, and would include a control logic portion similar to that of control logic portion 126c.

Figure 5A:
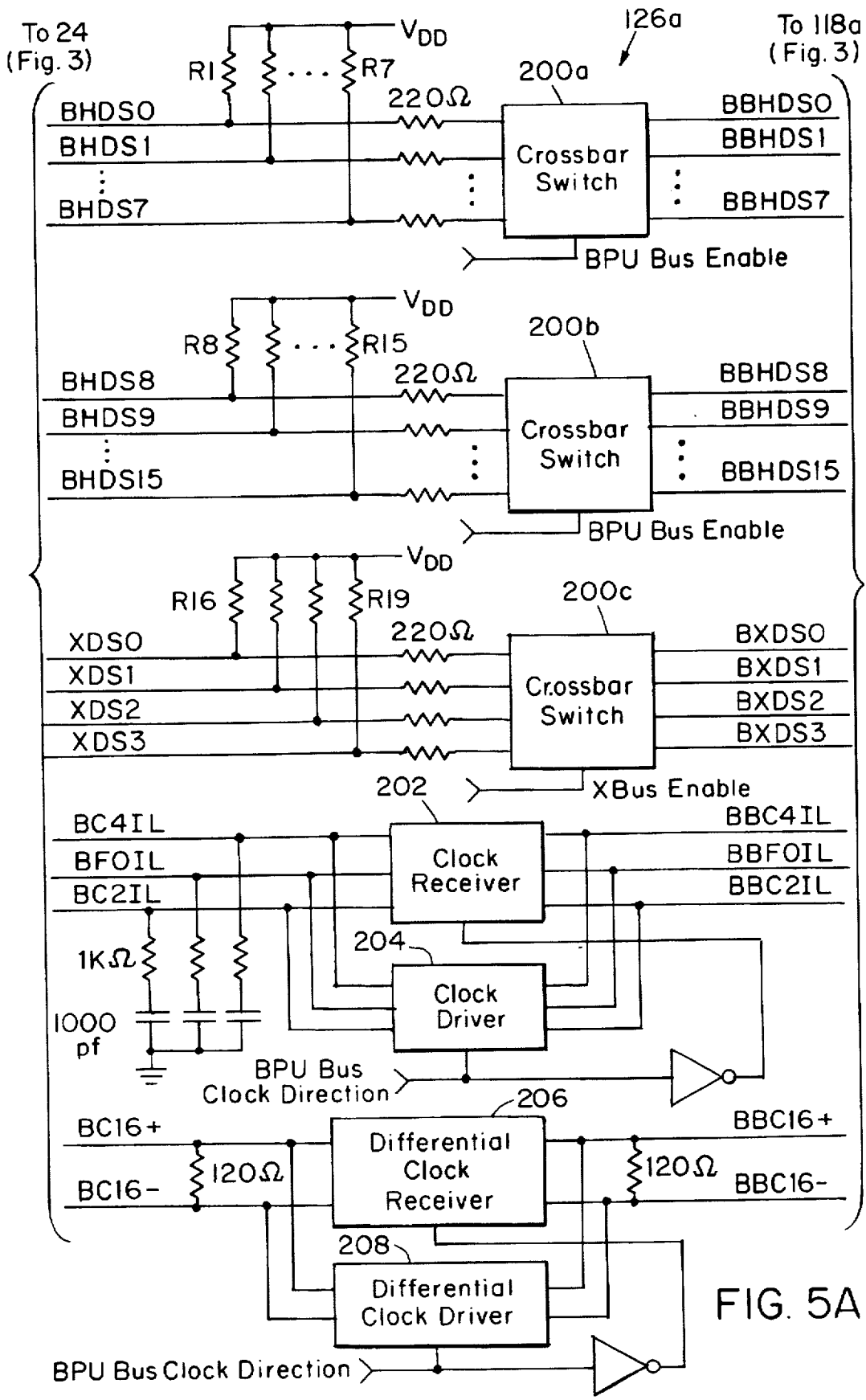
FIGS. 5a–c are detailed circuit diagrams of the isolation circuitry of the present invention.
Figure 5B:
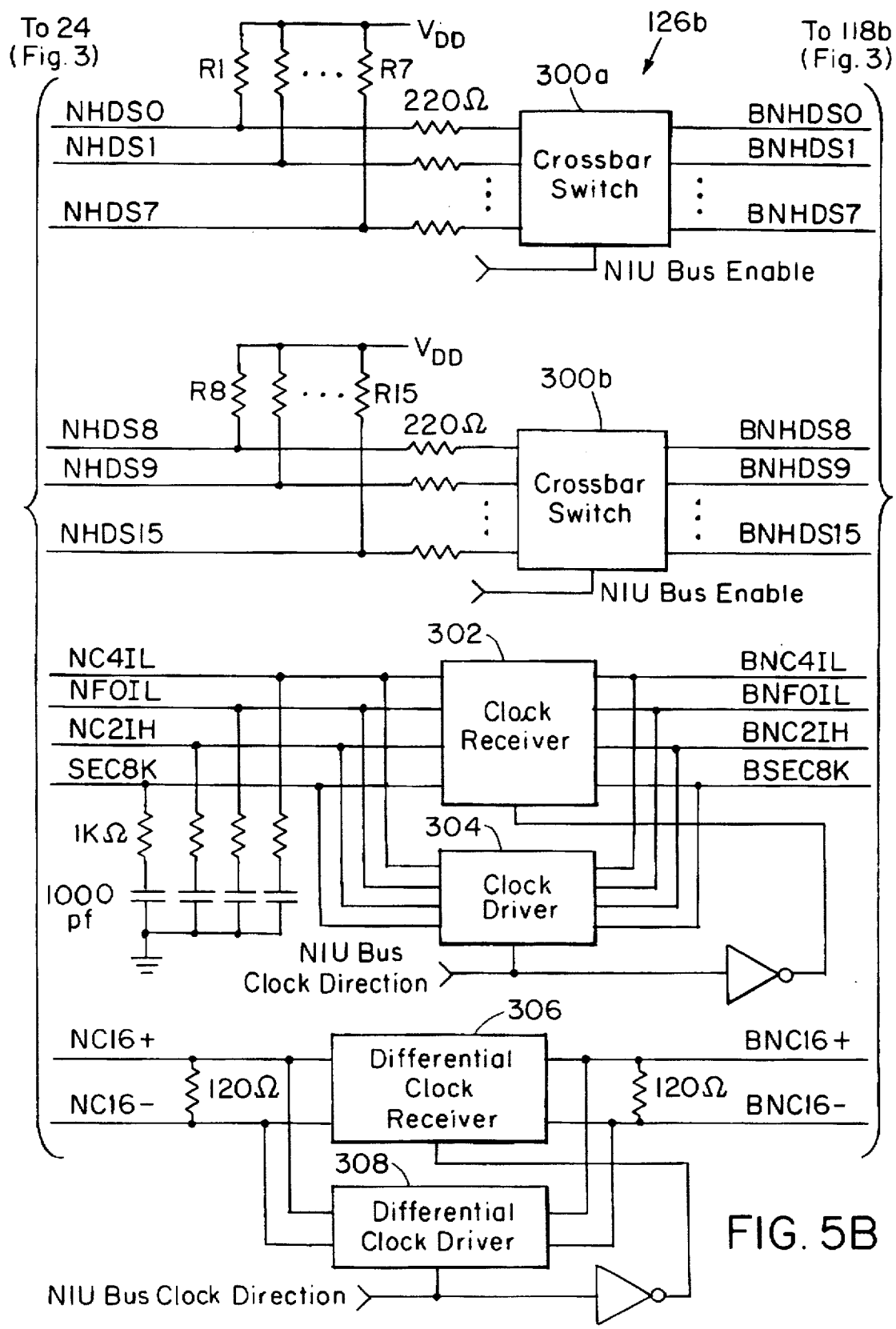
Figure 5C:
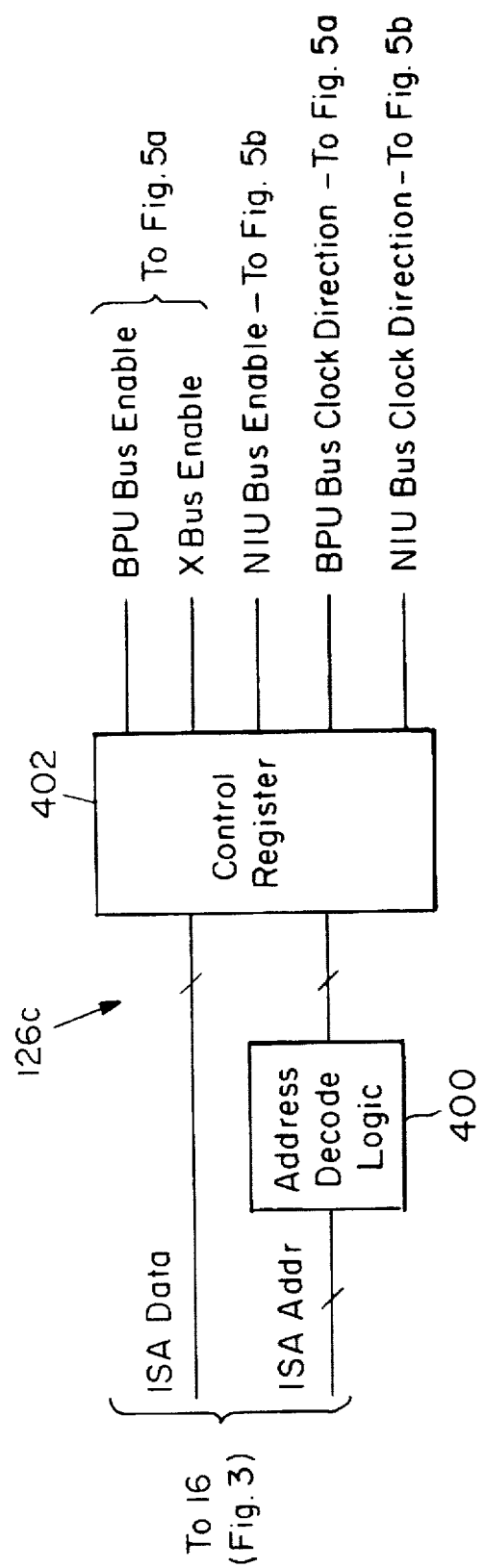

FIGS. 5a–5c show the isolation circuitry 126. FIG. 5a illustrates the circuitry which isolates the signals between ribbon cable 118a and the backplane data bus 24, and FIG. 5b illustrates the isolation circuitry which isolates the signals between ribbon cable 118b and the backplane data bus 24. FIG. 5c provides a block diagram for the isolation circuitry control logic. In the preferred embodiment, the signals carried on ribbon cable 118a and shown on the right side of FIG. 5a of isolation circuitry 126a are used to form the MVIP-compatible bus portions referred to as the BPU bus and an extension of the BPU bus, referred to as the X bus (or private bus) as described in U.S. patent application Ser. No. 08/329,274. The signals carried by ribbon bus cable 118b into the right side of FIG. 5b of the isolation circuitry 126b form an MVIP-compliant bus portion referred to as the NIU bus.

In FIG. 5a, the isolation circuitry 126a includes switching circuitry comprising switches 200a, 200b and 200c. Since the data streams can be driven by any circuit board in the system on a time slot by time slot basis, the switches are used to allow multiple outputs to drive the same signal line on the backplane data bus 24. Thus, an active time slot from the circuit board 110, for example, will drive the input to a particular switch high and low as appropriate and the output of the switch will drive the backplane data bus 24.

The switches 200a–200c provide bi-directional connections between the individual data signal paths BBHDS0–BBHDS15 and BXDS0–BXDS3 from circuit board 110 to data bus signal paths BHDS0–BHDS15 and XDS0–XDS3 towards data bus 24. The switches 200a–200c are preferably dual 4-bit switch devices, such as the SN74CBT3244 crossbar switch device manufactured by Texas Instruments. In the normal operating state, that is, when the circuit board 110 is plugged into the backplane 12 through the interposer board 125 (FIG. 3), the switches 200a–200c are enabled to allow bi-directional connections between the aforementioned signals. During a replacement or insertion operation, the switches 200a–200c are disabled and a high impedance state exists towards lines BHDS0–BHDS15 and XDS0–XDS3.

According to the MVIP bus specifications, all outputs driving the bus must have tri-state capability. When power is initially applied, all bus driving circuits must power up in the tri-state condition to guarantee the state of the data streams when they are not driven and thus, the MVIP system needs a slight pull-up to +5 volts. This is achieved by providing pull-up resistors R1–R19 of greater than or equal to 100 Kohms and less than or equal to 1 Mohm from each of the data streams to the +5 volt supply $V_{DD}$.

The clock circuitry in FIG. 5a comprises a clock receiver 202, clock driver 204, a differential clock receiver 206, and a differential clock driver 208. The clock circuitry (receivers and drivers) is needed to regenerate clock signals since it is likely that the maximum ribbon cable length of 20 inches specified in the MVIP standards will be exceeded in the ribbon bus cable reconfiguration of the present invention. In general, the clock signals are either driven to or received from the data bus 24, depending upon whether the particular circuit board 110 is a clock source for other circuit boards in the system. In an MVIP based system, one of the circuit boards provides the master clock for all the interfaces connected to an MVIP bus. If the circuit board 110 is configured as a master clock source, then the BPU bus clock direction signal is a high level which enables the clock driver 204 and disables the clock receiver 202. Similarly, the differential clock driver 208 is enabled and the differential clock receiver 206 is disabled.

The H-MVIP standard defines four clock signals: C16, /C4, C2, and /F0. The C16 signal is a differential clock signal which has a configurable termination consisting of a resistor of 120 ohms connected between C16+ and C16–. In a configured system, only the boards at the end of the bus have their configurable terminations enabled. Where the circuit board 110 is the clock source, the C16 differential clock signal is provided on leads BBC16+ and BBC16– which are input to differential clock driver 208 to drive the output to the data bus 24 on leads BC16+ and BC16–. Where the circuit board 110 is not the clock source, then the C16 differential clock signal is received from the data bus 24 on leads BC16+ and BC16– as input to differential clock receiver 206 to provide the clock signals to circuit board 110 on leads BBC16+ and BBC16–.

The signals /C4 and C2 are the Mitel ST-Bus 4.096 MHz and 2.048 MHz clocks. The /F0 signal is the Mitel ST-bus 8 KHz framing signal. Where the circuit board 110 is the clock source, the clock signals /C4, C2, and /F0 are received on lines BBC4IL, BBF0IL, and BBC2IL from the circuit board 110 as inputs to clock driver 204 for output to the data bus 24 on lines BC4IL, BF0IL and BC2IL. Each of the clock lines /C4, C2 and /F0 are electrically terminated with a 1 Kohm resistor in series with a 1000 pF capacitor to ground. The clock signal terminations are optional and would typically be provided in the circuit boards which are at both ends of the data bus 24. The other boards in the system between these two end boards do not need these terminations. These clock signal terminations are to meet the MVIP standards.

Referring to FIG. 5b, the isolation circuitry portion 126b is shown. The switches 300a and 300b perform the same function described with respect to switches 200a–200c in FIG. 5a. Specifically, switch 300a connects data signals BNHDS0–BNHDS7 from circuit board 110 to signals NHDS0–NHDS7 to backplane data bus 24. Switch 300b performs the same function with respect to signal lines BNHDS8–BNHDS15 from circuit board 110 to data lines NHDS8–NHDS15 to backplane data bus 24.

Since the NIU bus portion is an independent and separate MVIP-compliant bus, a separate series of clock signals is required. Thus, clock signals /C4, C2 and /F0 are driven or received through the clock receiver driver pair 302, 304. In this MVIP-compliant NIU bus portion, a secondary 8 KHz signal line SEC8K is used to carry 8 KHz timing information. Thus, when the circuit board 110 provides the clock source for the NIU bus portion, clock signals BNC4IL, BNF0IL, BNC2IH, and BSEC8K are driven through clock driver 304 to the backplane data bus 24 on lines NC4IL, NF0IL, NC2IH and SEC8K. When the circuit board 110 is not the clock source, then the clock signals are received from the backplane data bus 24 on lines NC4IL, NF0IL, NC2IH and SEC8K through clock receiver 302 to lines BNC4IL, BNF0IL, BNC2IH and BSEC8K which are connected to the circuit board 110 via ribbon cable 118b.

The NIU bus clock direction signal sets the mode of the operation for the clock circuitry. When the NIU bus clock direction signal is a 1, the clock driver 304 is enabled and the clock receiver 302 is disabled. When the NIU bus clock direction signal is a 0, the clock receiver 302 is enabled and the clock driver 304 is disabled. The differential clock receiver 306 and the differential clock driver 308 are similarly operated. The clock receiver/driver pairs 202, 204 and 302, 304 are preferably octal buffers and line drivers with tri-state outputs such as the SN74AS244 device by Texas Instruments. The differential driver and receiver pairs 206, 208 and 306, 308 are preferably TI SN75ALS180 devices.

In FIG. 5c is shown a block diagram of the control logic 126c of the isolation circuitry 126. The control logic 126c provides the control and selection signals for operating the isolation circuitry 126a and 126b. The control logic 126c may be under software control through the ISA bus. Address decode logic 400 decodes ISA address lines for reading and writing the control register 402 in conjunction with the ISA data lines. In normal operation, that is, with a circuit board 110 operating in the system, the control register 402 provides BPU BUS ENABLE, X BUS ENABLE and NIU BUS ENABLE signals to enable switches 200a–200c and 300a–300b (FIGS. 4a and 4b). The control register 402 also provides BPU BUS CLOCK DIRECTION and NIU BUS CLOCK DIRECTION signals which determine the operation of the clock circuitry as either a clock receiver or clock driver as described herein.

During an operation in which a circuit board is being replaced, extracted or inserted, the isolation circuitry may be disabled by writing the appropriate address and control registers for the particular slot for that circuit board 110. When the BPU BUS ENABLE, X BUS ENABLE, and NIU BUS ENABLE signals are HIGH, the associated switches 200a–200c and 300a–300b are open and a high impedance state exists such that the backplane data bus 24 is isolated from the selected circuit board 110. Once the clock and switching circuitry have been disabled, the ribbon cables 118a and 118b may be disconnected either at connectors 122a and 122b respectively, or at 120a and 120b respectively. The circuit board 110 can then be removed from the interposer board 125 without disrupting communications between other boards which are connected to the data bus 24. A new circuit board 110 may then be placed in the interposer board 125 and the ribbon cables 118a and 118b may then be reconnected. Having secured the new circuit board 110 in the interposer board 125, a control selection signal sent to the control logic 126c enables the isolation circuitry 126a and 126b to allow the clock and bi-directional data signals to pass between the backplane data bus 24 and the circuit board 110 as in normal operation.

Though the embodiments have been shown with respect to an ISA bus in a PC-based system together with an MVIP communication bus, the concepts of the present invention may also be applied with other system buses such as a Versa Module Eurocard (VME) bus in place of the ISA bus, for example. Similarly, the MVIP bus could instead be a Small Computer System Interface (SCSI) bus which is also a serial communications bus.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system comprising electronics boards plugged to a backplane common bus at first edges of the boards, the boards having data bus connectors at second edges thereof, with data bus cables connecting the data bus connectors in a bus, the system further comprising backplane data bus to which ends of the bus cables opposite to the board data bus connectors are connected such that a board may be disconnected from the data bus with disconnection of associated bus cables without disrupting communications between other boards on the data bus.

2. The system of claim 1 wherein the data bus comprises a synchronous serial bus.

3. Apparatus for replacing a circuit board in a live communication system without powering down comprising:

a backplane including a plurality of first connectors to a first bus and a plurality of second connectors to a second bus;

a plurality of circuit boards, each coupled to the backplane by one of the plurality of first connectors at a first board edge;

a plurality of data bus cables each removably coupled between one of the circuit boards at a second board edge and one of the second connectors for carrying first and second clock signals and bi-directional data signals; and isolation circuitry mounted on the backplane comprising:
(a) clock circuitry operable to pass first clock signals received from a respective circuit board to the second bus and to pass second clock signals received from the second bus to the respective circuit board; and
(b) switching circuitry operable to pass through bi-directional data signals to and from the second bus and the respective circuit board;

the isolation circuitry being responsive to a selection signal to disable the clock and switching circuitry when the respective circuit board is being replaced such that the second bus is isolated from the circuit board.

4. The apparatus of claim 3 wherein the second bus is a synchronous serial bus formed on the backplane and coupled to the plurality of connectors.

5. The apparatus of claim 3 wherein the isolation circuitry is mounted on a backplane interposer board.

6. Apparatus for replacing a circuit board in a live communication system without powering down comprising:

a backplane including a plurality of connectors;

a plurality of interposer boards, each coupled to the backplane by one of the plurality of connectors;

a plurality of circuit boards, each coupled to one of the interposer boards at a first circuit board edge; and a plurality of data bus cables each removably coupled between one of the circuit boards at a second circuit board edge and one of the interposer boards for carrying first and second clock signals and bi-directional data signals;

each of the interposer boards including isolation circuitry comprising:
(a) clock circuitry operable to pass first clock signals received from a respective circuit board to the backplane and to pass second clock signals received from the backplane to the respective circuit board; and
(b) switching circuitry operable to pass through bi-directional data signals to and from the backplane and the respective circuit board;

the isolation circuitry being responsive to a selection signal to disable the clock and switching circuitry when the respective circuit board is being replaced such that the backplane is isolated from the circuit board.

7. The apparatus of claim 6 further including a synchronous serial bus formed on the backplane and coupled to the plurality of connectors.

8. A method for replacing electronics boards in a live communication system without powering down, comprising the steps of:

plugging electronics boards to a backplane common bus at first edges of the boards, the boards having data bus connectors at second edges thereof;

connecting the data bus connectors in a bus with data bus cables; and connecting ends of the bus cables opposite to the board data bus connectors to a backplane data bus such that a board may be disconnected from the data bus with disconnection of associated bus cables without disrupting communications between other boards on the data bus.

9. A method for adding a circuit board in a live communication system without powering down, comprising the steps of:

generating a first selection signal;

disabling isolation circuitry in response to the first selection signal;

coupling the circuit board to a first backplane connector at a first board edge;

coupling a data bus cable between the circuit board at a second board edge and a second backplane connector for carrying first and second clock signals and bi-directional data signals;

generating a second selection signal; and enabling isolation circuitry in response to the second selection signal;

the isolation circuitry:
(a) passing first clock signals received from the circuit board to the backplane and passing second clock signals received from the backplane to the circuit board; and
(b) passing through bi-directional data signals to and from the backplane and the circuit board.

10. A method for adding a circuit board in a live communication system without powering down, comprising the steps of:

coupling an interposer board to a connector of a backplane;

generating a first selection signal;

receiving the first selection signal at the interposer board to disable isolation circuitry of the interposer board;

coupling the circuit board at a first circuit board edge to the interposer board;

coupling a data bus cable between the circuit board at a second circuit board edge and the interposer board for carrying first and second clock signals and bi-directional data signals;

generating a second selection signal; and receiving the second selection signal at the interposer board to enable isolation circuitry of the interposer board;

the isolation circuitry:
(a) passing first clock signals received from the circuit board to the backplane and passing second clock signals received from the backplane to the circuit boards; and
(b) passing through bi-directional data signals to and from the backplane and the circuit board.

* * * * *